(12) United States Patent
Su et al.

(10) Patent No.: US 11,013,358 B2
(45) Date of Patent: May 25, 2021

(54) FOOD STEAMING

(71) Applicant: KONINKLIJKE PHILIPS N.V., Eindhoven (NL)

(72) Inventors: Guangming Su, Eindhoven (NL); Donghai Yu, Eindhoven (NL); Wen Sun, Eindhoven (NL); Yun Chen, Eindhoven (NL); Xiaoyun Kui, Eindhoven (NL); Weihua Lu, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/314,784

(22) PCT Filed: Jun. 28, 2017

(86) PCT No.: PCT/EP2017/065941
§ 371 (c)(1),
(2) Date: Jan. 2, 2019

(87) PCT Pub. No.: WO2018/007218
PCT Pub. Date: Jan. 11, 2018

(65) Prior Publication Data
US 2019/0307282 A1     Oct. 10, 2019

(30) Foreign Application Priority Data

Jul. 5, 2016   (WO) ................. PCT/CN2016/088555
Sep. 20, 2016   (EP) ..................................... 16189658

(51) Int. Cl.
*A47J 27/04*       (2006.01)
*A47J 36/32*       (2006.01)

(52) U.S. Cl.
CPC ............... *A47J 27/04* (2013.01); *A47J 36/32* (2013.01); *A47J 2027/043* (2013.01)

(58) Field of Classification Search
CPC ....... A47J 2027/043; A47J 27/04; A47J 36/32
(Continued)

(56) References Cited

U.S. PATENT DOCUMENTS

| 2,620,789 | A | * | 12/1952 | Gregory | ................... | A47J 27/04 |
| | | | | | | 99/468 |
| 3,814,901 | A | * | 6/1974 | Morhack | ................. | F22B 1/287 |
| | | | | | | 219/401 |

(Continued)

FOREIGN PATENT DOCUMENTS

| CN | 105193243 | 12/2015 |
| EP | 1462010 A1 | 9/2004 |

(Continued)

OTHER PUBLICATIONS

Y.C Li et al. Atmospheric Research 166 (2015), pp. 83-91.

*Primary Examiner* — Dana Ross
*Assistant Examiner* — Ket D Dang (57) ABSTRACT

Disclosed is a food preparation apparatus (100) comprising a food preparation chamber and a pressure chamber (120) for generating steam coupled to the food preparation chamber through a conduit (130), wherein the pressure chamber comprises a heating element (121) for converting water into steam; and the conduit comprises an auto-relief valve (140) arranged to release the steam at a set pressure above atmospheric pressure from the pressure chamber into the food preparation chamber, thereby creating superheated steam in the food preparation chamber by the rapid expansion of the released volume of the above atmospheric pressure (saturated) steam. A method (200) of preparing food in such a food preparation apparatus (100) is also disclosed.

18 Claims, 8 Drawing Sheets

(58) Field of Classification Search
USPC .......... 219/401; 99/417, 410, 467, 474, 473,
99/349, 377; 126/20, 369; 122/451 R,
122/451.1, 451.2, 460, 466, 467, 483;
392/394, 399, 400, 405
See application file for complete search history.

(56) References Cited

U.S. PATENT DOCUMENTS

| | | |
|---|---|---|
| 8,216,431 B1 | 7/2012 | Tellam |
| 2003/0178411 A1 | 8/2003 | Manganiello |
| 2012/0230660 A1 | 9/2012 | Sotome |
| 2013/0228079 A1 | 9/2013 | Bjork |
| 2016/0360916 A1* | 12/2016 | Utsumi .................. F22B 1/285 |

FOREIGN PATENT DOCUMENTS

| | | |
|---|---|---|
| JP | 09273755 A | 10/1997 |
| JP | 2006046670 A | 2/2006 |
| WO | 2015086990 A1 | 6/2015 |

* cited by examiner

FOOD STEAMING

This application is the U.S. National Phase application under 35 U.S.C. § 371 of International Application No. PCT/EP2017/065941, filed on Jun. 28, 2017, which claims the benefit of International Application No. PCT/CN2016/088555 filed on Jul. 5, 2016 and International Application No. 16189658.4 filed on Sep. 20, 2016. These applications are hereby incorporated by reference herein.

FIELD OF THE INVENTION

The present invention relates to a food preparation apparatus comprising a food preparation chamber and a pressure chamber for generating steam coupled to the food preparation chamber through a conduit.

The present invention further relates to method of preparing food in such a food preparation apparatus.

BACKGROUND OF THE INVENTION

In modern society, there is an ever increasing focus on healthy living. This is for example demonstrated by the fact that more and more people are becoming increasingly conscious of the food they eat and how this food is prepared. For this reason, preparation of food by steaming is becoming increasingly popular, because of higher nutrient retention rates compared to for instance boiling as well as a lower risk of overcooking or burning the food compared to for instance frying due to the indirect contact between the heat source and the food, thereby also reducing the associated risk of generation of harmful by-products, e.g. pyrolization products during frying. Steaming has the further advantage that fatty food preparation products such as cooking oils can be avoided, thereby reducing the overall fat content in the food. This has the further advantage that the generation of harmful cooking fumes during the heating of such fatty food preparation products can be avoided. As demonstrated by Y. C. Li et al. in Atmospheric Research 166 (2015), pages 83-91, such cooking fumes can contain harmful concentrations of particulate matter, e.g. PM 2.5 particles. Moreover, a uniform temperature distribution through the food is more easily achieved by steaming compared to other cooking techniques.

However, a challenge when preparing food by steaming is to achieve the desired texture in the food. This is because the steam has a relatively low temperature compared to e.g. cooking oils when heated, such that of the chemical reactions in the food preparation process that give the food its desired texture, e.g. crust-forming reactions, may not occur because the steam temperature is too low to initiate such reactions. For example, when steaming food, it is difficult to achieve a crunchy crust on the food and water that condenses onto the food when the food is exposed to steam may cause any formed crust to go soggy or disappear.

To overcome these problems, food may be prepared using superheated steam. This is steam that can be cooled by a certain amount without causing condensation, such that contact of such superheated steam with the food significantly reduces the amount of condensation of water on the food due to the dry nature of such steam, which aids the formation of crusts on food, for instance. For example, JPH 09273755 discloses a cooking device using a high pressure steam generator in which superheated steam is generated by filling a porous body with water and heating the porous body through microwave radiation. Steam generated within the centre of the porous body is flow-restricted by steam or water near the surface of the porous body, causing its superheating by the continuation of application of microwaves. However, in such a device it is difficult to control the temperature of the superheated steam.

SUMMARY OF THE INVENTION

The present invention seeks to provide a food preparation apparatus that facilitates the preparation of food using superheated steam at controlled temperatures.

The present invention further seeks to provide a method of preparing food using such a food preparation apparatus.

According to an aspect, there is provided a food preparation apparatus comprising a food preparation chamber and a pressure chamber for generating steam coupled to the food preparation chamber through a conduit, wherein the pressure chamber comprises a heating element for converting water into steam; and the conduit comprises an auto-relief valve arranged to release the steam at a set pressure above atmospheric pressure from the pressure chamber into the food preparation chamber. The invention is based on the realization that (saturated) steam at a given pressure has a temperature as defined by the Antoine relation, which defines the boiling temperature of water as a function of the steam pressure over the water. Therefore, the provision of an auto-relief valve arranged to release the steam at a set pressure above atmospheric pressure from the pressure chamber into the food preparation chamber ensures that the temperature of the released steam is above 100° C. Upon release of a portion of this steam into the food processing chamber, this portion rapidly adiabatically (by approximation) expands into the volume of the food processing chamber, causing the pressure of the steam to drop, as dictated by the Clapeyron equation. This causes the formation of superheated steam as the lowered steam pressure means that the steam is no longer saturated and can be cooled without causing the steam to condense, e.g. onto the food, with the superheated steam having (approximately) retaining the temperature of the saturated steam being released into the food processing chamber.

In an embodiment, the auto-relief valve has a member movable between a first position in which the auto-relief valve is shut and a second position in which the auto-relief valve is opened, the member having a first surface facing the food preparation chamber and a second surface facing the pressure chamber, the first surface having a larger surface area than the second surface. This is a particularly simple valve design that may be implemented at low cost.

The set pressure of the auto-relief valve may be adjustable to control the temperature of the superheated steam in the food processing chamber. This advantageously allows the user to prepare foods at different temperatures such that for a particular type of food the ideal or preferred preparation temperature may be selected.

In an embodiment, the auto-relief valve has a flared or branched outlet into the food preparation chamber. It has been found that when the steam is released into the food preparation chamber through an outlet with such a shape, noise levels associated with the release of the steam are reduced, thereby providing a particularly quiet food preparation apparatus.

The food preparation apparatus may further comprise a user interface adapted to define at least one of the set pressure of the auto-relief valve and an operation time for the heating element to allow a user to configure the operation of such a food preparation apparatus.

In an embodiment, the conduit comprises a first branch including the auto-relief valve and a second branch comprising a safety valve arranged to release the steam at a further set pressure above the set pressure from the pressure chamber external to the food preparation apparatus. This further increases the safety of the food preparation apparatus, as the build-up of an undesirable overpressure in the pressure chamber, e.g. in case of the auto relief valve failing to open, is avoided by the presence of the safety valve.

The conduit may further comprise at least one sensor selected from a temperature sensor and a pressure sensor, wherein the safety valve is responsive to the at least one sensor. This facilitates a particularly accurate operation of the safety valve in that the safety valve is opened at a defined pressure or temperature as monitored by the pressure or temperature sensor in the conduit.

The food preparation apparatus may further comprise an alarm generation device arranged to generate an alarm upon the pressure in the pressure chamber reaching the further set pressure and/or upon the temperature in the pressure chamber reaching a set temperature. This enables a user to disengage the food preparation apparatus or otherwise interfere in the operation of the food preparation apparatus.

The first preparation apparatus may further comprise a breaker switch adapted to disconnect a power supply from the heating element upon the pressure in the pressure chamber reaching the further set pressure and/or upon the temperature in the pressure chamber reaching a set temperature. Such a breaker switch ensures that further build-up of overpressure of the steam in the pressure chamber is avoided, thereby reducing the risk of structural failure of the pressure chamber or any other component exposed to such overpressure.

In an embodiment, the pressure chamber comprises a water reservoir and the heating element comprises a heating coil arranged in the water reservoir. This is a particularly cost-effective implementation of such a heating element.

The food preparation chamber may comprise an outlet including at least one filter element to allow cooking fumes to escape from the food preparation chamber with significantly reduced levels of potentially harmful constituents, e.g. PM 2.5 particles, due to the presence of the at least one filter element in the outlet. Such a filter element for example may be a particulate matter (PM) filter or a carbon filter to reduce particle concentrations or food smells in the released cooking fumes.

The food preparation apparatus may further comprise a condensing compartment comprising the outlet to capture condensed steam, e.g. for recycling purposes or for preventing excessive condensation of the steam onto the food.

According to another aspect, there is provided a method of preparing food in a food preparation apparatus according to any embodiment of the present invention, the method comprising placing a food product in the food preparation chamber; filling the pressure chamber with an amount of water; heating the amount of water to form steam; and releasing the steam from the pressure chamber into the food preparation chamber by opening the auto-release valve upon the steam pressure reaching a set value above atmospheric pressure, thereby forming superheated steam in the food preparation chamber. Foods are prepared in accordance with this method benefits from an improved texture due to the exposure of the food to superheated steam as previously explained.

In an embodiment, the method further comprises setting the pressure at which the auto-release valve releases the steam into the food preparation chamber in order to control the temperature of the superheated steam, i.e. the temperature at which the food is cooked.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
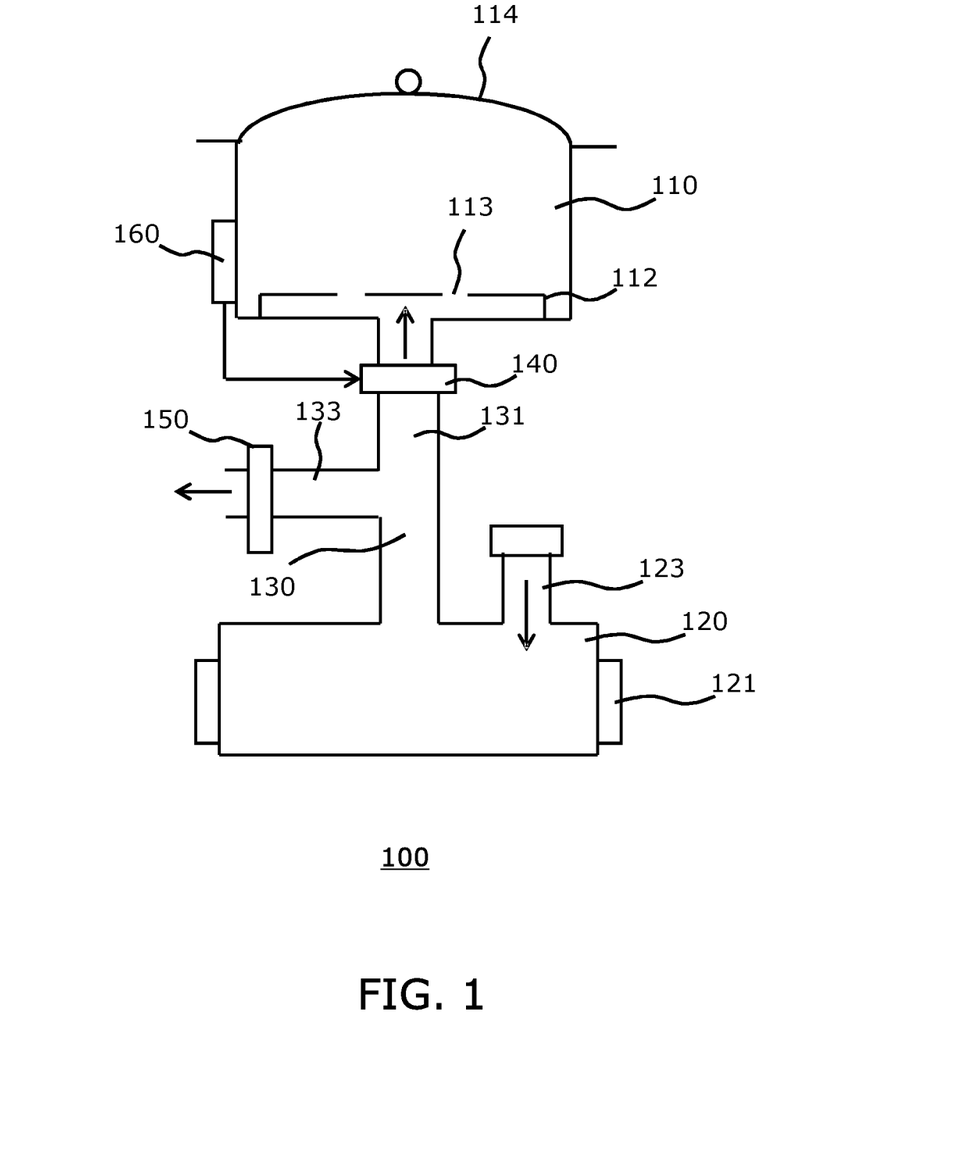
FIG. 1 schematically depicts a food preparation apparatus according to an embodiment.

FIG. 1 schematically depicts a food preparation apparatus 100 according to an embodiment. The food preparation apparatus 100 comprises a pressure chamber 120 in fluid communication with a food preparation chamber 110 through a conduit 130, e.g. a steam pipe or the like. A heating element 121 is thermally coupled to the pressure chamber 120 such that water in the pressure chamber 120 may be heated to form steam. In an embodiment, the pressure chamber 120 comprises a water reservoir in which the heating element 121 in the form of a heating coil is located. Moreover, other suitable embodiments of such a heating element 121 will be immediately apparent to the skilled person. The pressure chamber 120 further comprises a water inlet 123 through which the pressure chamber 120 may be filled with an amount of water. The water inlet 123 may be hermetically sealed, e.g. using a screw cap or the like, in order to hermetically sealed the pressure chamber 120 and allow a build-up of overpressure in the pressure chamber 120. The pressure chamber 120 and the conduit 130 are typically made such that the pressure chamber 120 and the conduit 130 can sustain a pressure above atmospheric pressure such that steam in the pressure chamber 120 and the conduit 130 can be pressurized to above atmospheric pressure. For example, the pressure chamber 120 and the conduit 130 may be designed to be able to sustain pressures of up to 12 atmosphere (1.21 MPa).

The conduit 130 comprises an auto release valve 140 that is designed to release an amount of steam generated in the pressure chamber 120 into the food preparation chamber 110 upon the steam in the pressure chamber 120 reaching a set pressure above atmospheric pressure. As can be understood from below Equation 1, which is also known as the Antoine relationship, the increase in pressure P (MPa) of steam causes water to boil at a higher temperature T (° C.), such that the steam is generated at that higher temperature.

$$\ln(P)=9.3876-3826.36/(T-45.47) \quad (1)$$

The relationship in Equation 1 is valid from about 100-250° C. As can be understood from below Equation 2, which is also known as the Clapeyron equation, upon release of a volume $V_1$ of (saturated) steam having an above atmospheric pressure $P_1$ and a temperature $T_1$ into the food preparation chamber 110 having a volume $V_2 \gg V_1$, the volume of the released steam will rapidly adiabatically expand and the pressure of the steam will rapidly reduce to the atmospheric pressure in the food preparation chamber 110.

$$P_1 V_1/T_1 = P_2 V_2/T_2 \quad (2)$$

These results in the formation of superheated steam, as the temperature $T_2$ of the steam in the food preparation chamber 110 approximates, i.e. is not significantly reduced compared to, $T_1$, whereas the condensation point (temperature) of the steam has lowered due to the reduced pressure of the steam, as can be understood from Equation (1), such that the steam at temperature $T_2$ may be cooled to a lower temperature before condensing. Consequently, when such superheated steam is brought into contact with the food in the food preparation chamber 110, condensation on the food is reduced, whereas the superheated nature of the steam further facilitates the occurrence of crust-forming reactions as previously explained, thereby ensuring that food with a desired texture may be obtained.

The food processing chamber 110 may comprise a food support structure 112, e.g. a food rack or the like comprising a plurality of steam holes 113 through which steam may be passed in order to evenly steam the food. For example, the steam may enter the food processing chamber 110 through the food support structure 112 including the steam holes 113. A removable lid or a door 114 may be present on the food processing chamber 110. The food processing chamber 110 and the lid or door 114 individually may be made of any suitable material, e.g. a plastics material, a metal, a metal alloy, a ceramic material or combinations thereof.

In an embodiment, the auto release valve 140 may be configurable. Specifically, the pressure at which the auto release valve 140 is released may be configurable. To this end, the auto release valve 140 may be responsive to a user interface 160 of the food preparation apparatus at which the user may directly set the pressure at which the auto release valve 140 releases a volume $V^1$ of steam into the food processing chamber 110 or may indirectly set the pressure at which the auto release valve 140 releases a volume $V^1$ of steam into the food processing chamber 110, e.g. by specifying the temperature T at which the steam is to be released, which relation to the pressure P may be approximated by the ideal gas law in Equation (3):

$$PV=nRT \quad (3)$$

In this equation, V is the volume of the steam, n is the amount of gas (in moles) and R is the ideal gas constant. Any suitable type of user interface 160 may be used for this purpose, such as one or more of a dial, a series of buttons, a programmable display, which may be a touch-screen display and so on.

In an embodiment, the conduit 130 further comprises a safety valve 150 arranged to evacuate steam external to the food preparation apparatus 100 when the steam reaches a further set pressure above the set pressure at which the auto-release valve 140 releases steam into the food preparation chamber 110. The safety valve 150 provides protection against the auto-release valve 140 not properly releasing, e.g. getting stuck, such that problems with the auto-release valve 140 do not lead to a build-up of critical pressures in the pressure chamber 120 and conduit 130 at which these structures may fail because the safety valve 150 may evacuate the steam from the food preparation apparatus 100 before such critical pressures are reached, i.e. the further set pressure at which the safety valve 150 releases the steam from the conduit 130 is lower than this critical pressure. The conduit 130 may be a branched conduit including a first branch 131 in which the auto-release valve 140 is located and a second branch 133 in which the safety valve 150 is located.

Figure 2:
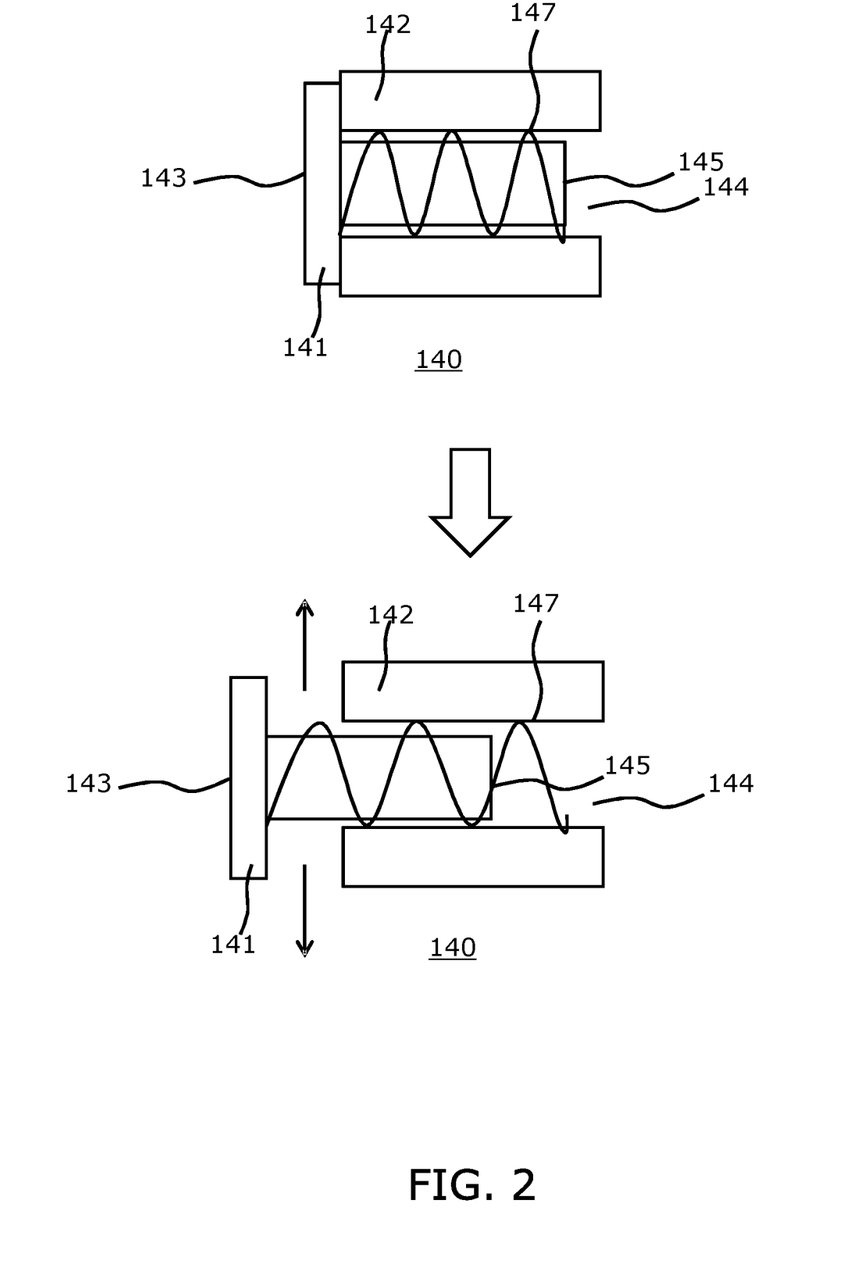
FIG. 2 schematically depicts the operating principle of an auto-release valve of a food preparation apparatus according to an embodiment.

FIG. 2 schematically depicts an operating principle of an example embodiment of an auto-release valve 140. In this embodiment, the auto-release valve 140 comprises a member 141 such as a plunger in a housing 142. The member 141 is movable in the housing 142 between a first position in which the auto-relief valve is shut (top configuration), e.g. by the plunger head sealing a cavity 144 in the housing 142 in which the member 141 is movable, and a second position in which the auto-relief valve 140 is opened (bottom configuration), due to the plunger head being pushed away from the housing 142, such that the cavity 144 becomes fluidly connected to the food preparation chamber 110 and a volume of steam in the conduit 130 may be released into the food preparation chamber 110 through the cavity 144 as indicated by the arrows in the bottom configuration of the auto-release valve 140 in FIG. 2.

To achieve the release of the member 141 from the housing 142 at the desired (set) pressure, the member may have a first surface 143 facing the food preparation chamber 110 and a second surface 145 facing the pressure chamber 120, with the first surface 143 having a larger surface area than the second surface 145. The force acting on each surface may be expressed as F=P.S, in which S is the surface area of the surface. For the auto-release valve 140 to open, $P_1 S_1 < P_2 S_2$, in which $P_1$ is the atmospheric pressure in the food preparation chamber 110, $S_1$ is the surface area of surface 143, $P_2$ is the pressure in the conduit 130 and $S_2$ is the surface area of the surface 145. The release of steam into the food preparation chamber 110 will lower the pressure $P_2$ in the conduit 130 such that at the point where $P_1 S_1 > P_2 S_2$ the auto-release valve 140 will shut again. Therefore, the pressure $P_2$ at which steam is released into the food preparation chamber 110 may be set by controlling the surface area ratio $S_1/S_2$. Alternatively or additionally, the pressure P2 at which steam is released into the food preparation chamber 110 may be controlled by restriction element such as a mechanical spring 147, an elastoplastic member (not shown) or the like exerting a force onto the member 141 that retains the member 141 against the housing 142, which force must be overcome by a larger counteracting force generated by the steam pressure on the member 141 as will be readily understood by the skilled person.

Figure 3:
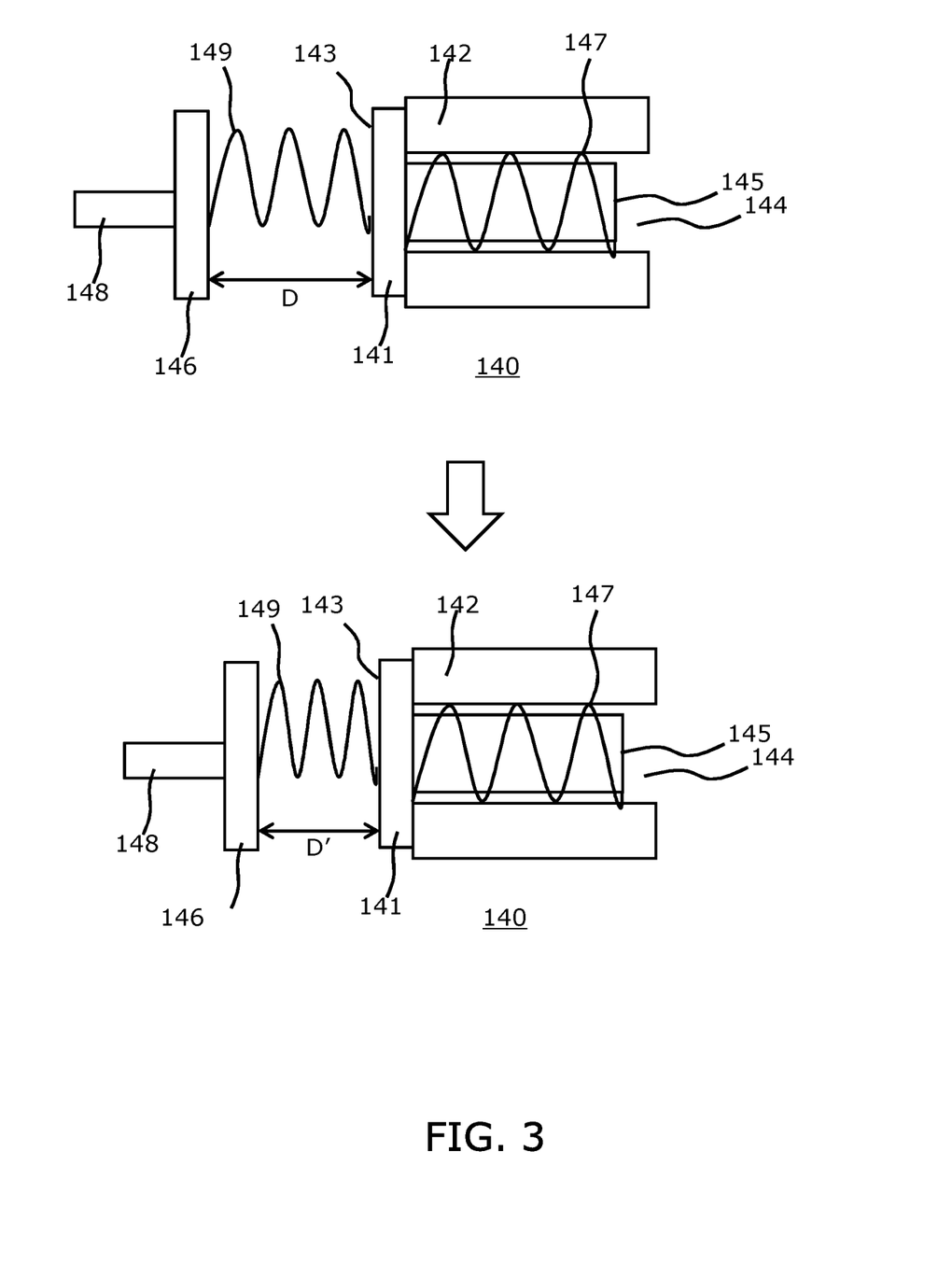
FIG. 3 schematically depicts an example embodiment of a configurable auto-release valve of a food preparation apparatus according to an embodiment.

An example embodiment of a configurable auto release valve 140 is schematically depicted in FIG. 3. In this embodiment, the valve 140 further comprises a further member 146 coupled to the member 141 through a compressible element 149 such as a spring, a compressible body such as a plastic ball, and so on. The distance D between the member 141 and the further member 146 may be adjusted through adjustment member 148, which for example may be a threaded rod or the like under control of the user interface as previously explained. For example, by reducing the distance D to D' with the adjustment member 148 as schematically depicted in FIG. 3, the pressure to be exerted by the generated steam on the member 141 to cause the release of the valve 140 is increased due to the fact that the effective spring constant of the compressible element 149 attached to the first surface 143 has increased due to the partial compression of the compressible element 149. Other suitable embodiments of such a configurable auto release valve 40 will be immediately apparent to the skilled person.

Figure 4:
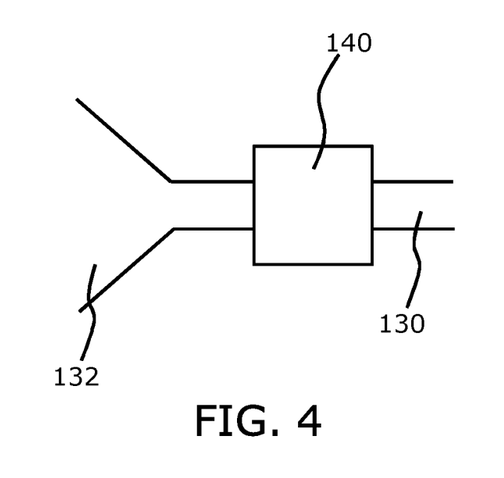
FIG. 4 schematically depicts an auto-release valve of a food preparation apparatus according to an advantageous embodiment.
Figure 5:
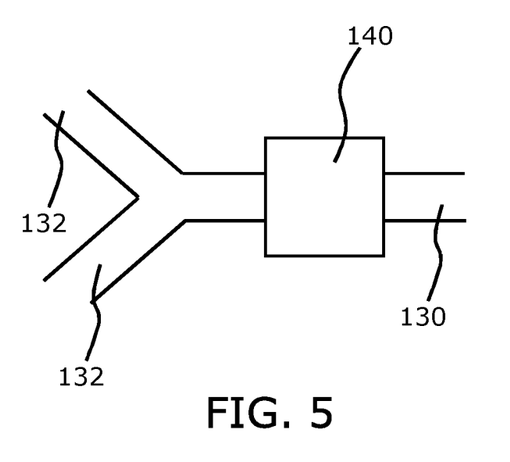
FIG. 5 schematically depicts an auto-release valve of a food preparation apparatus according to another advantageous embodiment.

In FIG. 4, an embodiment of the auto-release valve 140 is schematically depicted in which the auto-release valve 140 in connected between the conduit 130, e.g. the branch 131, and a flared outlet 132 into the food preparation chamber 110. In FIG. 5, an embodiment of the auto-release valve 140 is schematically depicted in which the auto-release valve 140 in connected between the conduit 130, e.g. the branch 131, and a branched outlet 132 into the food preparation chamber 110. Such a flared or branched outlet further aid the rapid expansion of the released steam into the food preparation chamber 110 by reducing the friction between the outlet 132 and the steam. This has the further advantage that the noise produced by the release of the steam into the food preparation chamber 110 is reduced, resulting in a quieter operation of the food preparation apparatus 100.

Figure 6:
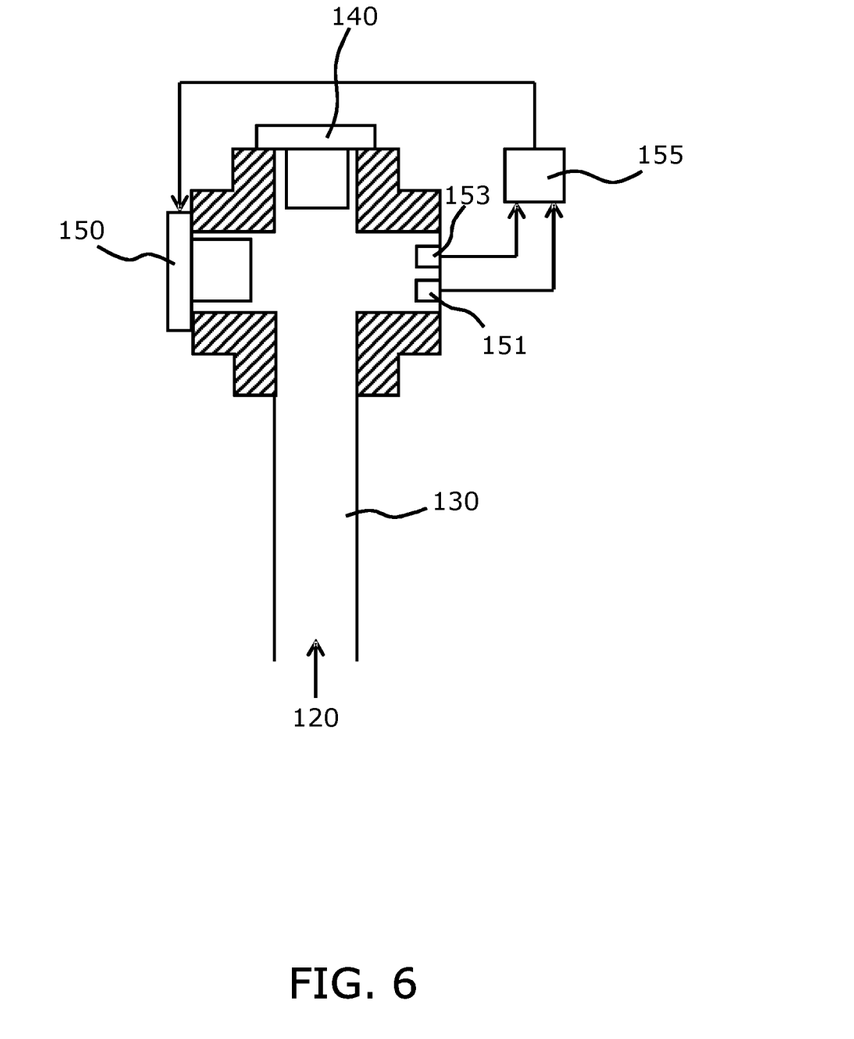
FIG. 6 schematically depicts an aspect of the food preparation apparatus according to an embodiment.

FIG. 6 schematically depicts an embodiment of the conduit 130 including the safety valve 150 in addition to the auto-release valve 140 as previously explained. In this embodiment, the conduit 130 further houses at least one of a temperature sensor 151 and a pressure sensor 153, which may be realized using any suitable sensor design. The temperature sensor 151 and/or the pressure sensor 153 may be coupled to a controller 155 arranged to control the operation of the safety valve 150. Specifically, the controller 155 may be adapted to trigger the evacuation of steam from the food processing apparatus 100 through the safety valve 150 upon receiving a sensor signal from the temperature sensor 151 indicative of the steam in the conduit 130 reaching a critical temperature and/or upon receiving a sensor signal from the pressure sensor 153 indicative of the steam in the conduit 130 reaching a critical pressure. The set temperature and/or the set pressure at which the controller 155 triggers the evacuation of steam from the food processing apparatus 110 through the safety valve 150 may be a factory setting or may be user-defined, e.g. through the user interface 160.

Figure 7:
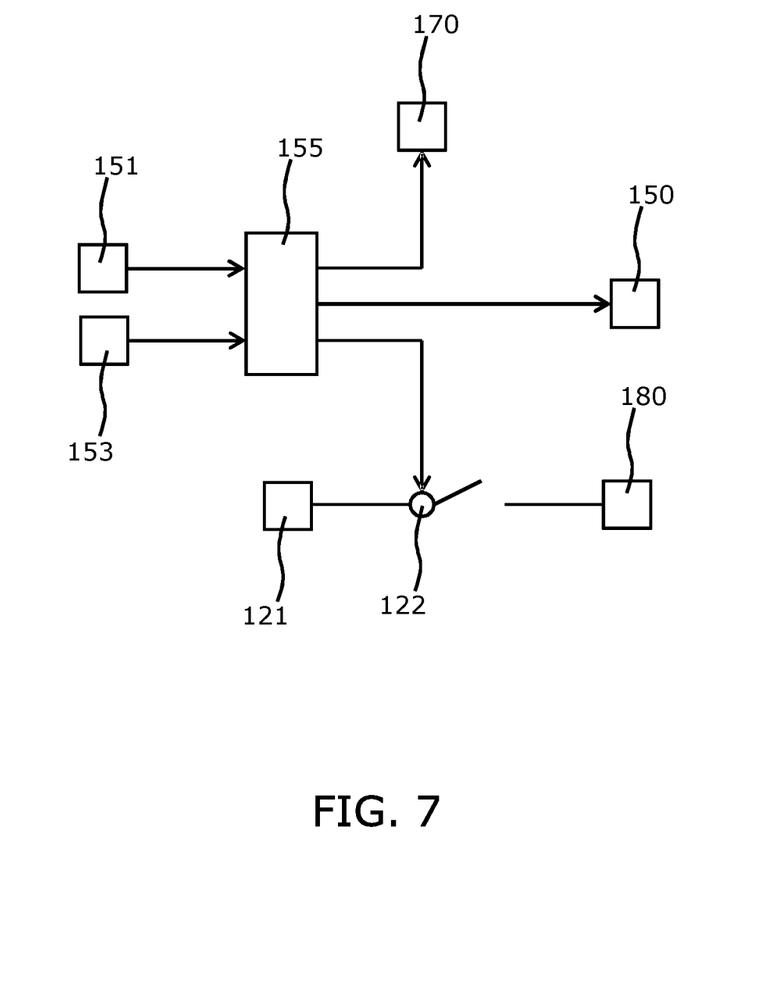
FIG. 7 schematically depicts another aspect of the food preparation apparatus according to an embodiment.

As schematically depicted in the circuit diagram in FIG. 7, the food preparation apparatus 100 may further comprise an alarm generation device 170 responsive to the controller 155 adapted to generate an alarm, e.g. an audible alarm or a visible alarm, upon the controller 155 upon receiving a sensor signal from the temperature sensor 151 indicative of the steam in the conduit 130 reaching a critical temperature and/or upon receiving a sensor signal from the pressure sensor 153 indicative of the steam in the conduit 130 reaching a critical pressure. In this manner, a user of the food preparation apparatus 100 may be alerted by the alarm generation device 170 that a problem has occurred in the operation of the food preparation apparatus 100, such that the user can take appropriate measures, e.g. disconnect the food preparation apparatus 100 from a power supply, to rectify or otherwise address the problem in response to noticing the alarm. Any suitable alarm generation device 170, e.g. a loudspeaker, a display, one or more LEDs, and so on, may be used for this purpose. A combination of such alarm generation devices may also be used.

In an embodiment, the food preparation apparatus 100 may further comprise a breaker switch 122 under control of the controller 155 arranged to disrupt a supply of power from a power supply 180, e.g. a mains socket or the like, to the heating element 121 in response to the controller 155 receiving a sensor signal from the temperature sensor 151 indicative of the steam in the conduit 130 reaching a critical temperature and/or receiving a sensor signal from the pressure sensor 153 indicative of the steam in the conduit 130 reaching a critical pressure. In this manner, the heating element 121 may be automatically switched off to prevent a potentially dangerous situation.

Figure 8:
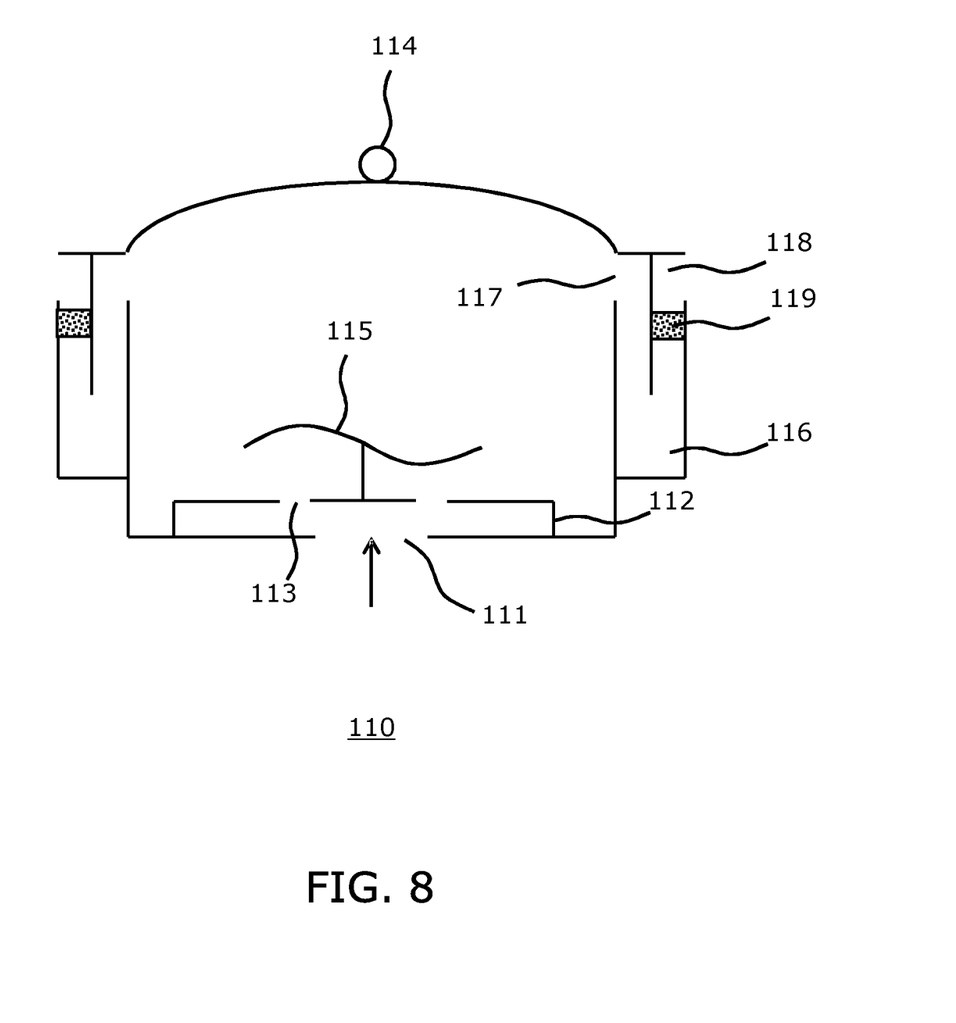
FIG. 8 schematically depicts a food preparation chamber of the food preparation apparatus according to an embodiment.

FIG. 8 schematically depicts a cross-section of a food preparation chamber 110 according to an example embodiment. In this example embodiment, the food preparation chamber 110 may comprise a food support member 112 including steam holes 113 as previously described as well as a stirring member 115 coupled to a motor (not shown) for stirring the food to be prepared during steaming to further facilitate evenly cooking of the food. For example, such a stirring member 115 may be arranged to rotate at a rotation speed of 6-30 rotations per minute, which may be a fixed rotation speed or may be a user-defined rotation speed, e.g. as specified by a user through the user interface 160. The food preparation chamber 110 may further comprise a cooking fumes collection compartment, which may form an integral part of the food preparation chamber 110 or alternatively may be detachable therefrom. The cooking fumes collection compartment comprises a condensing compartment 116 in fluid communication with the main compartment of the food preparation chamber 110 through a steam inlet 117, which preferably is located well above the level at which the food is placed in the food preparation chamber 110, e.g. located directly underneath the lid 114 although other suitable locations of course are equally feasible. The condensing compartment 116 may further comprise an outlet 118 including at least one filter element 119 such as a particulate matter (PM) filter and a carbon filter in order to remove potentially harmful particles, smells, etcetera from any fumes expelled from the food preparation chamber 110 through the outlet 118.

At this point it is noted that the outlet 118 including the at least one filter element 119 may be located in any suitable location of the food preparation chamber 110 and does not necessarily form part of the cooking fumes collection compartment. In addition, it is reiterated that the food preparation chamber 110 may take any suitable shape, e.g. may be an oven chamber, air fryer chamber or the like.

Figure 9:
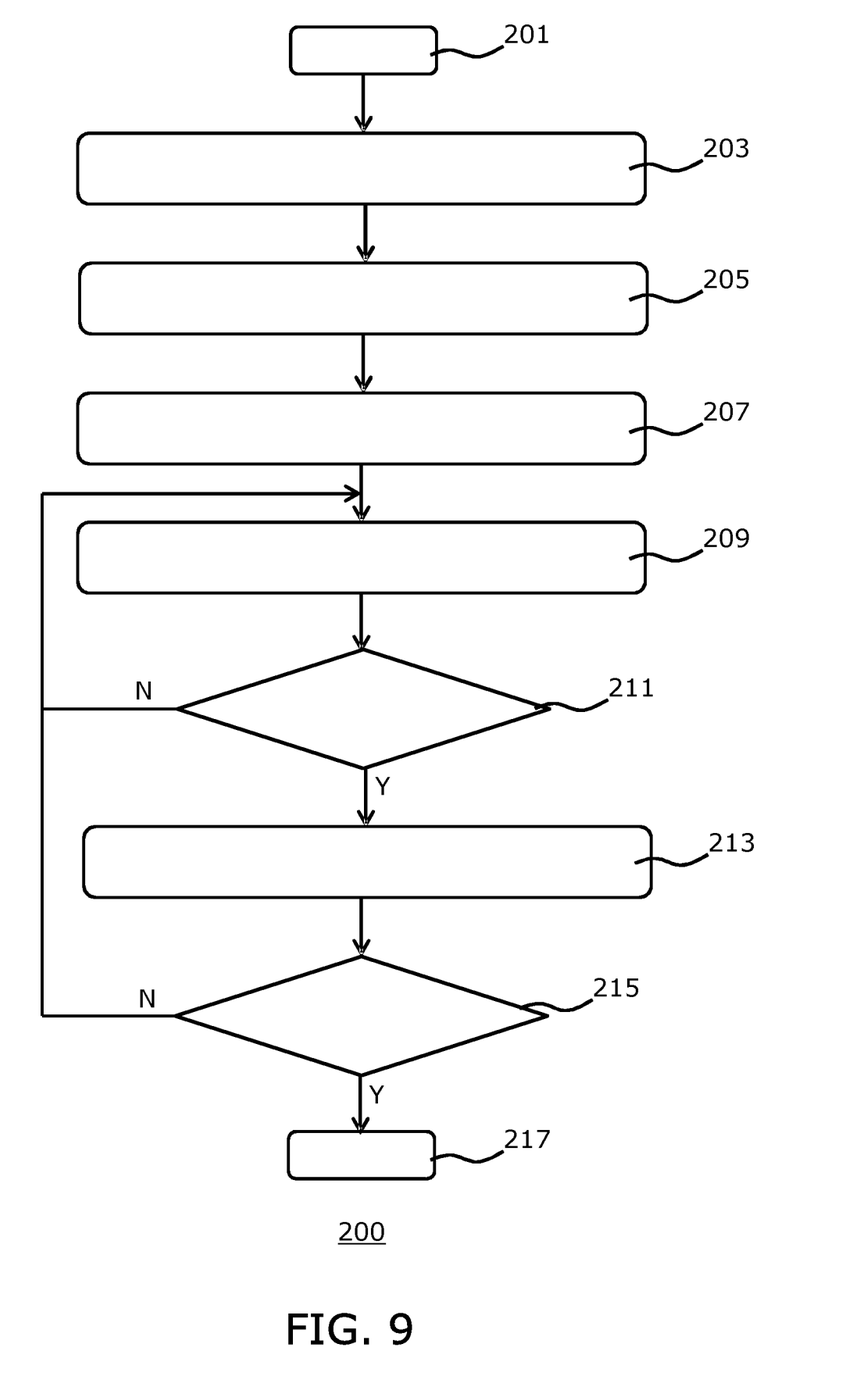
FIG. 9 schematically depicts a flowchart of a food preparation method according to an embodiment.

FIG. 9 is a flowchart of a method 200 of preparing a food product with the food preparation apparatus 100. The method 200 starts in 201 and proceeds to 203 in which a food product to be steamed is placed in the food preparation chamber 110, e.g. by opening the lid 114, placing the food product on the food support structure 112 and sealing the food preparation chamber 110 by placing the lid 114 on the food preparation chamber 110. In 205, which may be performed prior to or after 203, the pressure chamber 120 is filled with an amount of water that is sufficient to generate enough steam during the entire food preparation process of the food product. For example, the water inlet 123 may be opened, water may be filled into the pressure chamber 120 through the water inlet 123 after which the water inlet 133 may be sealed again in order to hermetically seal the pressure chamber 120 as previously explained.

Next, the heating element 121 is engaged in 209 to heat the amount of water such as to form steam. Optionally, this may be preceded by a user setting the pressure (temperature) in 207 at which the auto-release valve 140 releases a volume of the steam into the food preparation chamber 110 as explained in more detail above. Step 207 may be omitted, e.g. in case of a non-configurable auto-release valve 140 adapted to release a volume of steam into the food preparation chamber 110 at a fixed pressure.

The pressure of steam collected in the conduit 130, e.g. a steam pipe or the like, is gradually increased as schematically depicted in 211 until the steam in the conduit 130 reaches the set pressure at which the auto-release valve 140 releases a volume of steam into the food preparation chamber 110 in 213, which is converted into superheated steam by the rapid adiabatic expansion of the steam in the food preparation chamber 110 as previously explained. In 215, it is checked if the food preparation method 200 has completed. If this is not the case, e.g. because a set cooking time has not yet expired, the method 200 reverts back to 209; otherwise, the method 200 terminates in 217.

In order to demonstrate the principles of the present invention, in a cooking experiment, broccoli, zucchini and spinach were cooked three ways, A: using conventional steaming for 15 minutes, B: using air frying at 160° C. for 5 minutes and C using the food preparation apparatus 100 by configuring the auto-release valve 140 to periodically release steam at a temperature of 160° C. during a 5-minute cooking cycle. It was demonstrated for each of these vegetables that with the cooking method of the present invention, improved taste and crust formation was achieved without compromising nutrient content. In fact, for spinach and zucchini improved polyphenol retention was achieved.

In a further experiment, the nutrient retention capabilities of the cooking method of the present invention were compared against an air frying technique, which is renowned for its excellent nutrient retention capabilities. The results are summarized in Table I.

TABLE I

| Vegetable | Nutrient | Gain (%) | Cooking condition |
|---|---|---|---|
| Broccoli (florets of ~3 cm head width and ~1 cm stem length) | Vitamin C (ascorbic acid + dehydroascorbic acid) | 48 | 160° C., 3 min. |
| | Polyphenols | 22 | 180° C., 5 min. |
| Carrot (slices of 5 mm thickness) | β-carotene | 33 | 180° C., 5 min. |
| Zucchini (slices of 5 mm thickness) | Vitamin C (ascorbic acid + dehydroascorbic acid) | 65 | 160° C., 5 min. |
| | Folate | 114 | 160° C., 5 min. |
| | Polyphenols | 22 | 160° C., 5 min. |
| Potato chips | Vitamin C (ascorbic acid + dehydroascorbic acid) | 20 | 180° C., 5 min. |

The cooking condition specifies the temperature at which steam was released into the food preparation chamber 110 and the duration of the cooking process. The gain expresses the increase in nutrient content of the cooked food product compared to the same food product prepared by air frying. The above experiments clearly demonstrate that with the food preparation method according to embodiments of the present invention, excellent nutrient retention can be obtained whilst achieving excellent sensory attributes in the cooked food product.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A food preparation apparatus comprising a food preparation chamber and a pressure chamber for generating steam coupled to the food preparation chamber through a conduit, wherein:
the pressure chamber comprises a heating element configured and arranged to convert water into steam; and
the conduit comprises an auto-relief valve configured and arranged to release the steam from the pressure chamber into the food preparation chamber upon detecting that the steam in the pressure chamber reaches a set pressure above atmospheric pressure from the pressure chamber into the food preparation chamber, and
wherein the set pressure is configurable by specifying a temperature at which the steam is to be released into the food preparation chamber.

2. The food preparation apparatus of claim 1, wherein the pressure chamber comprises a water reservoir and the heating element comprises a heating coil arranged in the water reservoir.

3. The food preparation apparatus of claim 1, wherein the auto-relief valve has a member movable between a first position in which the auto-relief valve is shut and a second position in which the auto-relief valve is opened, the member having a first surface facing the food preparation chamber and a second surface facing the pressure chamber, the first surface having a larger surface area than the second surface.

4. The food preparation apparatus of claim 1, wherein the set pressure of the auto-relief valve is adjustable.

5. The food preparation apparatus of claim 1, wherein the auto-relief valve has a flared or branched outlet into the food preparation chamber.

6. The food preparation apparatus of claim 1, further comprising a user interface adapted to define at least one of the set pressure of the auto-relief valve and an operation time for the heating element.

7. The food preparation apparatus of claim 1, wherein the conduit comprises a first branch including the auto-relief valve and a second branch comprising a safety valve arranged to release the steam at a further set pressure above the set pressure from the pressure chamber external to the food preparation apparatus.

8. The food preparation apparatus of claim 7, wherein the conduit further comprises at least one sensor selected from a temperature sensor and a pressure sensor, wherein the safety valve is responsive to the at least one sensor.

9. The food preparation apparatus of claim 7, further comprising an alarm generation device arranged to generate an alarm upon the pressure in the pressure chamber reaching the further set pressure and/or upon the temperature in the pressure chamber reaching a set temperature.

10. The food preparation apparatus of claim 7, further comprising a breaker switch adapted to disconnect a power supply from the heating element upon the pressure in the pressure chamber reaching the further set pressure.

11. The food preparation apparatus of claim 1, wherein the food preparation chamber comprises an outlet including at least one filter element.

12. The food preparation apparatus of claim 11, wherein the at least one filter element comprises at least one of a particulate matter (PM) filter and a carbon filter.

13. The food preparation apparatus of claim 11, wherein the food preparation chamber comprises a condensing compartment comprising the outlet.

14. The food preparation apparatus of claim 1, wherein the pressure chamber and the conduit sustain pressures above atmospheric pressure of up to 1.21 MPa.

15. A food preparation apparatus comprising a food preparation chamber and a pressure chamber for generating steam coupled to the food preparation chamber through a conduit, wherein:
the pressure chamber comprises a heating element configured and arranged to convert water into steam; and
the conduit comprises an auto-relief valve configured and arranged to release the steam from the pressure chamber into the food preparation chamber upon detecting that the steam in the pressure chamber reaches a set pressure above atmospheric pressure from the pressure chamber into the food preparation chamber, wherein the set pressure is configurable by specifying a temperature at which the steam is to be released into the food preparation chamber, and
wherein the auto-relief valve has a member movable between a first position in which the auto-relief valve is shut and a second position in which the auto-relief valve is opened, the member having a first surface facing the food preparation chamber and a second surface facing the pressure chamber, the first surface having a larger surface area than the second surface, and
wherein the auto-relief valve further comprises a further member coupled to the member movable between the first position and the second position through a compressible element, whereby a distance D between the member and the further member is adjustable through an adjustment member under control of a user interface.

16. The food preparation apparatus of claim 15, wherein the compressible element is one of a spring or a plastic ball.

17. The food preparation apparatus of claim 15, wherein the adjustable element is a threaded rod.

18. A food preparation apparatus comprising a food preparation chamber and a pressure chamber for generating steam coupled to the food preparation chamber through a conduit, wherein:
the pressure chamber comprises a heating element configured and arranged to convert water into steam; and
the conduit comprises an auto-relief valve configured and arranged to release the steam from the pressure chamber into the food preparation chamber upon detecting that the steam in the pressure chamber reaches a set pressure above atmospheric pressure from the pressure chamber into the food preparation chamber, wherein the set pressure is configurable by specifying a temperature at which the steam is to be released into the food preparation chamber, and
the food preparation chamber including a food support structure comprising a plurality of steam holes through which steam passes in order to evenly steam food to be prepared, and
the food preparation chamber further including a stirring member coupled to a motor configured and arranged to stir the food to be prepared during steaming to further facilitate even cooking of the food, wherein the stirring member is configured to rotate at a rotation speed of between 6 and 30 rotations per minute.

* * * * *